United States Patent [19]

Abe

[11] 4,104,965
[45] Aug. 8, 1978

[54] CLUTCH FOR PERMITTING A DRIVEN MEMBER TO RUN AT DIFFERENT SPEED FROM A DRIVE MEMBER

[75] Inventor: Moriaki Abe, Tokyo, Japan
[73] Assignee: E.D.M. Co., Ltd., Tokyo, Japan
[21] Appl. No.: 714,662
[22] Filed: Aug. 16, 1976
[30] Foreign Application Priority Data
Oct. 16, 1975 [JP] Japan .............................. 50-140986[U]
[51] Int. Cl.² ............................................... B44B 5/02
[52] U.S. Cl. ...................................... 101/25; 64/27 C; 101/27
[58] Field of Search ............... 101/99, 95, 5, 8, 22–25, 101/27; 64/27 C, 27 CT, 27 CS

[56] References Cited

U.S. PATENT DOCUMENTS

| | | | |
|---|---|---|---|
| 717,976 | 1/1903 | Dodge | 64/27 C X |
| 2,637,213 | 5/1953 | Krueger | 64/27 C X |
| 2,729,078 | 1/1956 | Schmidt | 64/27 C X |
| 3,217,637 | 11/1965 | Worth | 101/25 |
| 3,721,185 | 3/1973 | Rambausek | 101/25 |
| 3,732,812 | 5/1973 | Bremner | 101/99 |
| 3,861,302 | 1/1975 | Mizutani | 101/99 |

*Primary Examiner*—Edward M. Coven
*Attorney, Agent, or Firm*—George B. Oujevolk

[57] ABSTRACT

A special-purpose clutch incorporated in a drive mechanism of hot stamping apparatus wherein heated type on a rotary type carrier is periodically pressed against a printing ribbon in superposition on a continuous strip of plastics or other material being fed at constant speed over a platen, thereby imprinting characters on the strip at constant spacings. The clutch comprises a drive disk mounted on a motor output shaft, a driven disk mounted on a type carrier shaft, and a spring through which rotation is normally imparted from the drive to driven disk. The spring is yieldable to permit the driven disk to be rotated, while the heated type is being pressed each time against the printing ribbon, by the strip of material at lower speed than the drive disk. The angular speed of the type being pressed against the ribbon can thus be precisely synchronized with the linear speed of the strip traveling over the platen.

1 Claim, 3 Drawing Figures

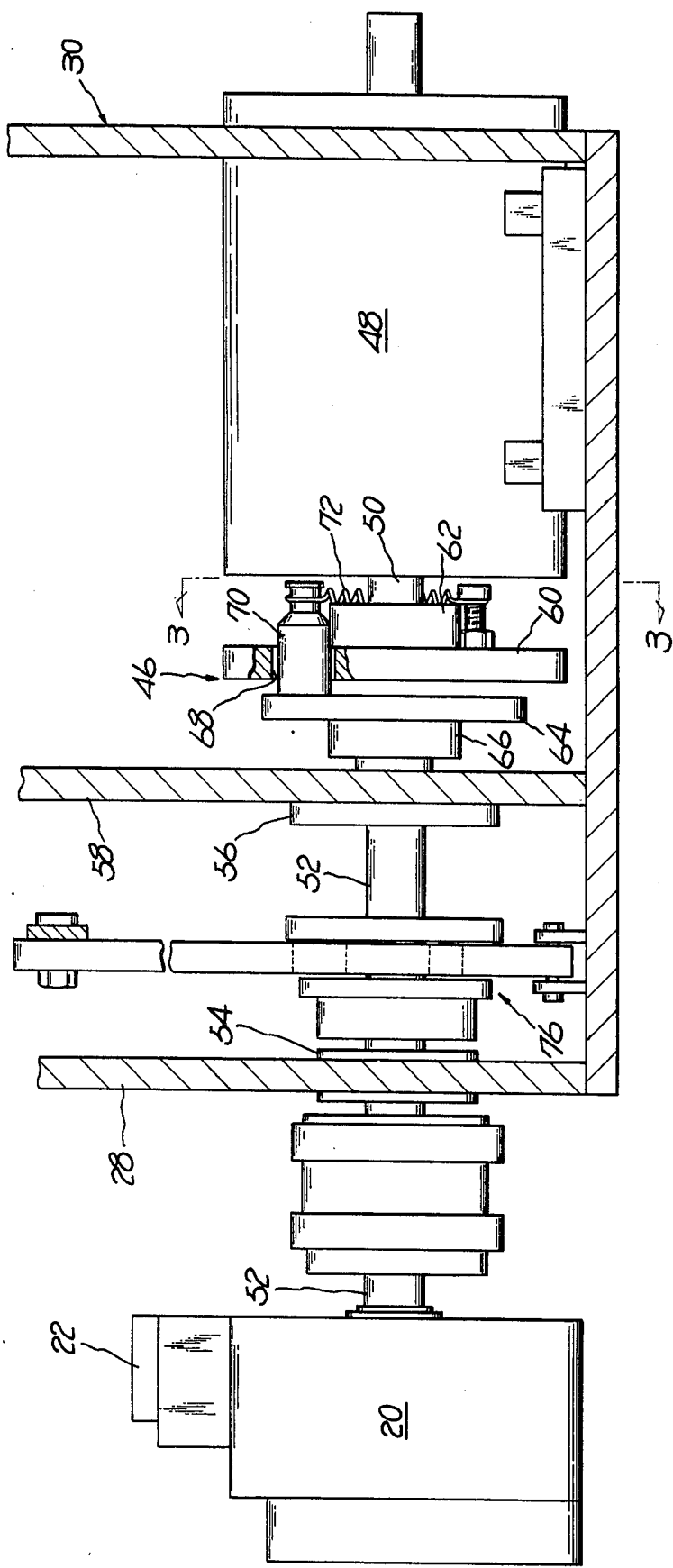

CLUTCH FOR PERMITTING A DRIVEN MEMBER TO RUN AT DIFFERENT SPEED FROM A DRIVE MEMBER

CROSS-REFERENCE TO RELATED APPLICATION

An application entitled "Rotary Hot-stamping Method and Apparatus", invented by me and assigned to the instant assignee, is filed substantially concurrently herewith Ser. No. 714,660, filed Aug. 16, 1976.

BACKGROUND OF THE INVENTION

My invention relates to a special-purpose clutch for permitting a driven member to rotate at speed different from that of a drive member. The clutch according to my invention is suitable for use, for example, in rotary hot-stamping apparatus of the type described and claimed in my separate application cross-referenced above, the contents of which are incorporated herein insofar as is necessary for a full understanding of the invention.

In rotary hot-stamping apparatus of the type under consideration, a printing ribbon extending from payoff reel to takeup reel is placed in superposition on a continuous strip of plastics, paper or other material being fed at constant speed over a platen which may be in the form of a rotary cylinder. Type having a relief character or characters formed on its face is mounted on a rotary type carrier over the platen and is heated by a heater housed in the carrier. As the type carrier is rotated by a drive mechanism, usually including an electric motor, the heated type is periodically pressed against the printing ribbon in superposition on the strip of desired material traveling over the platen, thereby imprinting the character or characters on the strip at constant spacings.

The rotary hot-stamping apparatus of the above outlined type has the advantages, over reciprocating-type apparatus, of high speed operation and absolutely wasteless use of the printing ribbon. This type of apparatus has a problem, however, arising from the fact that the type is revolving while being pressed against the superposed ribbon and strip, which are themselves traveling over the platen, for imprinting characters on the strip. For making clear-out imprints, the angular speed of the type must be in precise agreement with the linear speed at which the strip is fed over the platen. The true utility of the rotary hot-stamping apparatus cannot be established unless a practical solution to this problem is developed.

SUMMARY OF THE INVENTION

It is an object of my invention to provide a novel clutch for permitting a driven member to rotate at different speed from a drive member.

Another object of my invention is to provide a clutch of the character described which is particularly well adaptable for use in a drive mechanism of rotary hot-stamping apparatus, for permitting its type to revolve at exactly synchronous speed with a strip of desired material to be printed on each time the type is pressed against a printing ribbon in superposition on the strip.

A further object of my invention is to provide a clutch of the character described which is so simplified in construction, and so compact in size, that it can be easily incorporated in the drive mechanism of the rotary hot-stamping apparatus without any substantial alteration of its existing parts and without adding much to the cost of the apparatus.

Stated in its perhaps broadest aspect, my invention comprises a drive member rotated in a predetermined direction about a fixed axis, a driven member rotatable about an axis in line with the axis of the drive member, means for interconnecting the drive and driven members so as to permit the driven member to rotate relative to the drive member through a predetermined angle, and spring means for normally holding the driven member in a predetermined angular position relative to the drive member. The spring means is yieldable to permit the driven member to rotate at speed different from that of the drive member.

In a preferred embodiment of my invention, in which the invention is adapted for the drive mechanism of rotary hot-stamping apparatus, there is disclosed a clutch comprising a drive disk fixedly mounted on a motor output shaft, and a driven disk fixedly mounted on a type carrier shaft. A pin affixed eccentrically to the driven disk is received in an arcuate slot in the drive disk for movement therealong, so that the driven disk is rotatable relative to the drive disk through an angle limited by the length of the slot. Normally held by a spring at the forward end of the slot with respect to the predetermined rotational direction of the drive disk, the pin is movable toward the rearward end of the slot against the force of the spring to permit the type carrier shaft to be rotated at speed less than the motor output speed.

During operation of the hot stamping apparatus, the heated type is pressed so hard against the superposed printing ribbon and strip of desired material that the type carrier shaft can be rotated by the strip being fed at constant speed over the platen. If the speed of the type carrier shaft being thus rotated by the strip is less than that of the motor output shaft, then the clutch will function to disconnect the two shafts and hence to permit the type to revolve at exactly synchronous speed with the strip. The clutch pin is spring returned to the forward end of the slot when the type subsequently releases the superposed ribbon and strip, so that the clutch transmits the rotation of the motor output shaft to the type carrier shaft as long as the type is revolving out of contact with the ribbon.

Thus, exact agreement between the angular speed of the type and the linear speed of the strip can be realized while the type is being pressed each time against the superposed ribbon and strip. Highly clear-cut imprints of the characters on the typeface can therefore be formed on the strip of material via the printing ribbon.

The above and other objects, features and advantages of my invention and the manner of attaining them will become more apparent, and the invention itself will best be understood, upon consideration of the following description of the preferred embodiment taken in connection with the accompanying drawings.

BRIEF DESCRIPTION OF THE DRAWINGS

FIG. 2 is a slightly enlarged, vertical sectional view taken along the line 2—2 of FIG. 1, the view showing the drive mechanism of the hot stamping apparatus incorporating a preferred form of the clutch according to my invention, with the clutch being shown partly broken away.

DESCRIPTION OF THE PREFERRED EMBODIMENT

In the accompanying drawings my invention is shown adapted for use in a drive mechanism of rotary hot-stamping apparatus disclosed in my aforementioned application filed concurrently herewith and entitled "Rotary Hot-stamping Method and Apparatus." Reference is directed to that application for greater details of the hot stamping apparatus than are disclosed herein.

Figure 1:
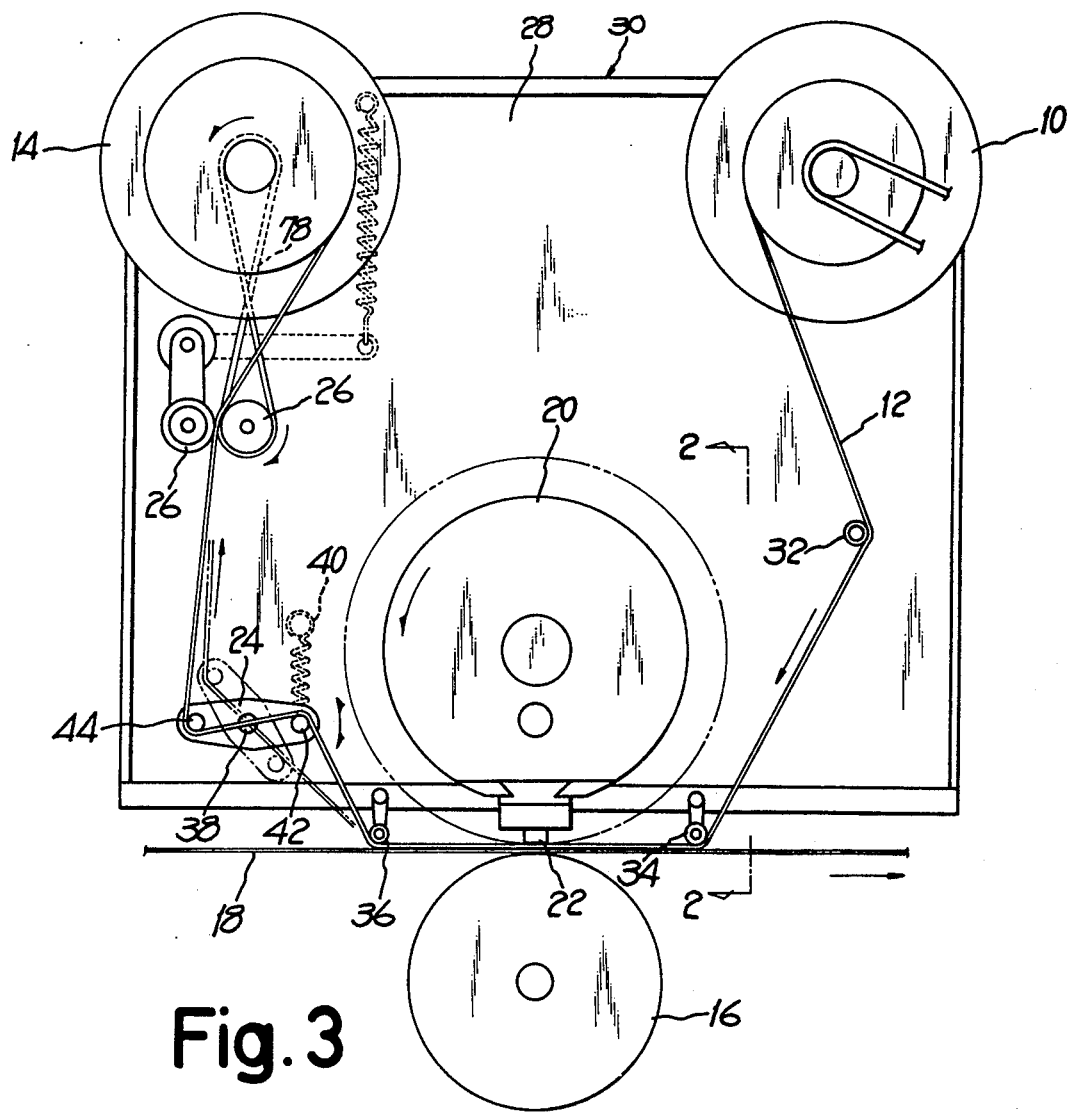
FIG. 1 is a front elevational view of rotary hot-stamping apparatus to which my invention is applicable to advantage.

As shown in FIG. 1, the hot stamping apparatus broadly comprises a payoff reel 10 from which a printing ribbon 12 of any known or suitable make is fed, a takeup reel 14 for winding up successive desired lengths of the printing ribbon, a cylindrical platen 16 over which passes a continuous strip of plastics or other material 18 to be printed on, a rotary type carrier 20 carrying type 22 for pressing same against the printing ribbon for imprinting characters on the strip of material passing over the platen, a pullback lever 24 for yieldably holding an extra length of the printing ribbon between the platen and the takeup reel, and a pair of drawoff rollers 26 for drawing the successive desired lengths of the printing ribbon from between the platen and the type carrier via the pullback lever and for feeding the ribbon toward the takeup reel.

Of the above listed parts, the payoff reel 10, takeup reel 14, type carrier 20 and drawoff rollers 26 are all rotatably mounted on the front panel 28 of a boxlike casing 30 in which are accommodated the drive mechanism, incorporating the clutch according to my invention, and other parts of the apparatus hereinafter described. The axes of rotation of these reels, type carrier and rollers are all parallel to each other.

The platen 16 is suitably mounted under the type carrier 20 so as to be free to rotate about an axis parallel to, and in vertical register with, the rotational axis of the type carrier. During operation of this hot stamping apparatus the strip of material 18 is to be fed from left to right, as seen in FIG. 1, over the platen 16 at constant speed.

For guiding the printing ribbon 12 as it travels from the payoff reel 10 to the takeup reel 14, generally in a direction opposite to the direction of travel of the strip of material 18 over the platen 16, three guide rollers 32, 34 and 36 are mounted on the casing front panel 28. Of these the guide rollers 34 and 36 are intended to place the printing ribbon in superposition on the strip of material as the ribbon passes between the platen 16 and the type carrier 20.

In order to be periodically pressed against the printing ribbon 12 placed as above in superposition on the strip of material 18 over the platen 16, the type 22 is fixedly but replaceably mounted on the type carrier 20, which is to be rotated counterclockwise, as seen in FIG. 1, during operation of the apparatus. This type carrier has a built-in heater, not shown, for heating the type in accordance with the prior art. The type 22 has a relief character or, usually, a set of relief characters formed on its face for direct contact with the printing ribbon on the strip of material, so that the metal layer, for example, in the ribbon may be transferred to and imprinted on the strip in the exact shape of the relief character or characters on the typeface, as has been known heretofore.

While the type 22 on the rotating type carrier 20 is being pressed each time against the printing ribbon 12 on the strip of material 18 over the platen 16, the ribbon is transported by the strip a predetermined distance in the reverse direction, that is, toward the payoff reel 10, relative to the platen. The pullback lever 24 is designed to permit such reversed travel of the printing ribbon without necessitating the reversed rotation of the takeup reel 14 and, when the ribbon is subsequently released by the type, to pull back the ribbon the same distance toward the takeup reel relative to the platen.

For performing the above functions, the pullback lever 24 is pivotally supported at a point intermediate both ends thereof by a pin 38 mounted on the casing front panel 28. A relatively light extension spring 40 biases the pullback lever to turn counterclockwise, as viewed in FIG. 1, about the pivot pin 38. The counterclockwise turn of the pullback lever is limited by a stop, not shown, so that the lever is normally held in the angular position represented by the solid lines in FIG. 1. The pullback lever has a pair of rollers 42 and 44 rotatably mounted on its opposite ends, and the printing ribbon 12 is threaded over the right hand roller 42 and under the left hand roller 44, on its way from the guide roller 36 to the pair of drawoff rollers.

Normally, therefore, the printing ribbon 12 is maintained in a zigzag pattern between the platen 16 and the drawoff rollers 26. As the ribbon is transported the predetermined distance in the reverse direction as aforesaid, the pullback lever 24 is turned clockwise against the bias of the extension spring 40 to the angular position indicated by the dot-and-dash lines in FIG. 1, thereby permitting the required extra length of the ribbon to be fed back toward or past the platen 16.

When the printing ribbon 12 is subsequently released by the type 22 upon completion of imprinting the character or characters on the strip of material 18, the pullback lever 24 is turned back to its normal angular position under the bias of the extension spring 40. The printing ribbon can therefore be returned the same distance past the platen 16 toward the takeup reel 14.

The pair of drawoff rollers 26 are to be actuated intermittently for feeding toward the takeup reel 14 just a length of the used printing ribbon corresponding to the width of the character or characters on the face of the type 22 after each time the imprint or imprints have been made on the strip of material 18. The takeup reel 14 is actuated simultaneously with the drawoff rollers for winding up the required length of the used printing ribbon.

FIG. 2 illustrates the drive mechanism for rotating the type carrier 20. The drive mechanism includes the clutch in accordance with the invention, generally labeled 46, for permitting the type carrier to be rotated at synchronous speed with the strip of material 18 while the type 22 on the carrier is being pressed against the printing ribbon 12 in superposition on the strip over the platen 16.

Shown at 48 in FIG. 2 is an electric motor drive unit, preferably of the adjustable speed type, mounted within the casing 30. This motor drive unit has an output shaft 50 which is coupled via the clutch 46 to a rotatable shaft 52 on which there is fixedly mounted the type carrier 20. The shaft 52 is rotatably supported by a bearing 54 mounted on the casing front panel 28 and another bearing 56 mounted on an upstanding wall 58 within the casing 30, so as to be in coaxial relationship to the motor output shaft 50.

For the purposes of this invention, the motor output shaft 50 will hereinafter be referred to as the drive shaft, and the type carrier shaft 52 as the driven shaft.

Figure 3:
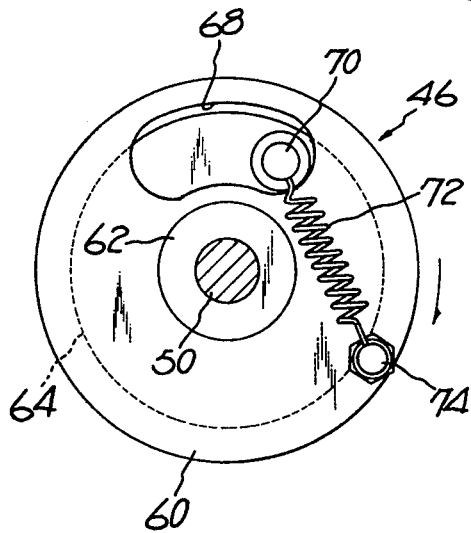
FIG. 3 is a vertical sectional view taken along the line 3—3 of FIG. 2.

With reference to both FIGS. 2 and 3, the clutch 46 in accordance with the invention comprises a drive disk 60 fixedly mounted on the drive shaft 50 via a collar 62, and a driven disk 64 fixedly mounted on the driven shaft 52 via a collar 66 in confronting relationship to the drive disk. The drive disk 60 has a slot 68 formed eccentrically therein, the slot being in the shape of a circular arc centered about the rotational axis of the drive disk or of the drive shaft.

Received with clearance in the arcuate slot 68 in the drive disk is a pin 70 fixedly mounted eccentrically on the driven disk 64. This pin is movable along the arcuate slot 68, so that the driven disk 64 is rotatable relative to the driven disk 60 through an angle limited by the length of the slot. An extension spring 72 extends between the pin 70 and a spring retainer 74 affixed to one of the faces of the drive disk 60 away from the driven disk 64. The extension spring 72 is intended to yieldably urge the pin 70 toward the forward end of the arcuate slot with respect to the predetermined rotational direction of the drive disk 60, which direction is clockwise as viewed in FIG. 3. The pin 70 is movable toward the rearward end of the arcuate slot against the force of the extension spring 72.

Thus, when the type 22 on the rotary type carrier 20 is not pressed against the printing ribbon 12, the rotation of the drive disk 60 is imparted to the driven disk 64 via the extension spring 72 and the pin 70, which pin is then located at the forward end of the arcuate slot 68 as shown in FIG. 3. The drive and driven disks 60 and 64 are thus rotated at the same speed.

As the type 22 is pressed against the printing ribbon 12 in superposition on the strip of material 18 over the platen 16, the type carrier is rotated not by the motor drive unit 48 but by the strip 18 being fed at constant speed over the platen. Thereupon the rotational speed of the driven disk 64 becomes lower than that of the drive disk 60, with the result that the pin 70 travels toward the rearward end of the arcuate slot 68 against the force of the extension spring 72. The pin is pulled back to the forward end of the slot by the extension spring when the type 22 subsequently releases the printing ribbon upon completion of imprinting the character or characters on the strip.

As may now be apparent, the clutch 46 would not function if the driven disk 64 were rotated at higher speed than the drive disk 60 while the type 22 was being pressed against the printing ribbon 12. Further, the clutch need not function if the driven disk is rotated at exactly the same speed as the drive disk while the type is being pressed against the printing ribbon. Since it is highly difficult to adjust the output speed of the motor drive unit 48 so that the angular speed of the type 22 driven thereby may be in precise agreement with the linear speed at which the strip of material is fed over the platen, the speed of the strip should rather be so determined in relation to the motor output speed that the driven disk will be rotated at slightly lower speed than the drive disk while the type is being pressed against the printing ribbon in superposition on the strip.

The reference numeral 76 in FIG. 2 generally designates a cam mechanism for translating the rotary motion of the driven shaft 52 into reciprocal motion. This reciprocal motion is transmitted via a one-way clutch, not shown, to the right hand one, as seen in FIG. 1, of the pair of drawoff rollers 26 to cause same to rotate intermittently through an angle corresponding to the width of the character or characters on the typeface. Such intermittent rotation of the right hand drawoff roller, which of course takes place while the type is revolving out of contact with the printing ribbon, is imparted to the takeup reel 14 via an endless belt 78.

OPERATION

While the operation of the rotary hot-stamping apparatus, as well as of the clutch incorporated in its drive mechanism, may be clearly apparent from the foregoing description, further amplification will be made in the following summary of such operation. The operation of the hot stamping apparatus can be commenced as the motor drive unit 48 and the unshown heater within the type carrier 20 are electrically turned on by activation of the respective switches, not shown, that may be arranged on either side panel of the casing 30. It is understood that the strip of material 18 starts traveling rightward over the platen 16 at the same time the type carrier 20 is set in counterclockwise rotation by the motor drive unit.

As the heated type 22 on the type carrier 20 is then pressed against the printing ribbon 12 in superposition on the strip of material 18 over the platen 16, the clutch 46 operates in the above described manner to disconnect the driven shaft 52 from the drive shaft 50, permitting the type carrier to be rotated by the strip passing over the platen. During such operation of the clutch, the driven disk 64 is understood to rotate at lower speed than the drive disk 60, so that the pin 70 on the driven disk travels toward the rearward end of the arcuate slot 68 against the force of the extension spring 72.

While the heated type 22 is being pressed against the printing ribbon 12 and is being revolved at speed exactly synchronized with the speed of the strip of material 18, the ribbon is transported a predetermined distance with the strip toward the payoff reel 10, and in the meantime the character or characters on the typeface are imprinted on the strip. The pullback lever 24 is turned clockwise about the pivot pin 38 against the bias of the extension spring 40 upon transportation of the printing ribbon in the reverse direction. The platen 16 is of course rotated clockwise by friction while the type is being pressed against same via the superposed ribbon and strip.

When the type 22 subsequently releases the superposed ribbon and strip upon completion of the printing operation, the pin 70 on the driven disk 64 of the clutch travels back to the forward end of the arcuate slot 68 in the drive disk 60 under the bias of the extension spring 72, so that the motor rotation is transmitted to the type carrier 20 through the clutch. Simultaneously, the pullback lever 24 is spring returned to its normal angular position to pull back the printing ribbon the required distance past the platen 16, while the strip of material 18 is allowed to continue traveling rightward at constant speed.

Then, while the type 22 is revolving out of contact with the printing ribbon, the cam mechanism 76 functions to rotate the right hand drawoff roller 26 through the predetermined angle corresponding to the width of the character or characters on the typeface. This drawoff roller coacts with the other drawoff roller to feed just the required length of the used printing ribbon toward the takeup reel 14.

Since the rotation of the right hand drawoff roller 26 is imparted to the takeup reel 14 by the endless belt 78, the required length of the used printing ribbon can be wound up onto this reel. Concurrently with the winding-up of the used printing ribbon onto the takeup reel, a fresh length of the ribbon is placed in superposition on the strip of material 18 over the platen 16 by being fed from the payoff reel 10.

By the repetition of the foregoing cycle of operation, the character or characters on the typeface are imprinted on the continuous strip of plastics or other material at constant longitudinal spacings. The imprints formed on the strip will be highly clear-cut ones since the type can be revolved at precisely synchronous speed with the strip while being pressed each time against the ribbon thereof.

While I have shown and described my invention in terms of its specific adaptation, the clutch of my invention is obviously applicable to hot stamping apparatus of other than the illustrated type and to machines or apparatus other than hot stamping apparatus. It is also understood that my invention is not to be limited by the exact details of the illustrated form of the clutch. For example, the slot in the drive disk may not be exactly in the shape of a circular arc since it is intended merely to limit the angle through which the driven disk is permitted to rotate relative to the drive disk. It is further recognized that the inventive principles are applicable where a driven member is desired to rotate at higher speed than the drive member, or to be held at a temporary standstill in spite of the continuous rotation of the drive member. Various modifications are contemplated and may obviously be resorted to by those skilled in the art without departing from the true spirit or scope of my invention.

I claim:

1. In hot stamping apparatus wherein heated type is pressed against a printing ribbon for imprinting characters on a continuous strip of material traveling in a predetermined direction over a platen at constant speed, the type having at least one relief character on its face, the combination of:
  (a) a support panel defining a ribbon travel path including thereon a rotatable payoff reel from which the printing ribbon is fed at one end of said defined travel path:
  (b) a rotatable takeup reel likewise supported by said panel at the other end of said defined travel path for accumulating the printing ribbon fed from said payoff reel, the printing ribbon traveling from said payoff reel to said takeup reel generally in a direction opposite to said predetermined direction and being placed in superposition on the strip of material over said platen;
  (c) a type carrier likewise supported by said support panel along said travel path between said payoff and takeup reels, having type fixedly mounted thereon and rotatable on said panel about a fixed axis over said platen, the type on said type carrier being adapted to be pressed against the printing ribbon on the strip of material over said platen;
  (d) drive means coupled to said type carrier for imparting rotation to said type carrier for revolving said type at speed synchronous with the speed of the strip of material and in a direction corresponding to said predetermined direction, comprising a source of rotary power, a drive shaft rotated by said source at predetermined speed in a predetermined direction, a drive disk fixedly mounted on said drive shaft, said drive shaft having a slot formed therein in the shape of a circular arc centered about the axis of said drive shaft, a driven shaft rotatably supported in coaxial relationship to said drive shaft and having said type carrier fixedly mounted thereon, said driven shaft being rotated by the strip of material in the same direction as said drive shaft and at speed less than the predetermined rotational speed of said drive shaft while the type on said type carrier is being pressed against the printing ribbon in superposition on the strip passing over said platen, a driven disk fixedly mounted on said driven shaft in confronting relationship to said drive disk, a pin affixed eccentrically to said driven disk and received with clearance in said slot in said drive disk for movement therealong, whereby said driven disk is rotatable relative to said drive disk through an angle limited by the length of said slot, and spring means yieldably urging said pin toward the forward end of said slot with respect to the predetermined rotational direction of said drive shaft for imparting the rotation of said drive disk to said driven disk, said pin being movable toward the rearward end of said slot against the force of said spring means for permitting said driven shaft to rotate at synchronous speed with the strip of material while the type on said type carrier is being pressed against the printing ribbon in superposition on the strip over said platen;
  (e) yieldable means supported on said panel between said takeup reel and said type carrier tending to hold an extra length of the printing ribbon between said platen and said takeup reel, whereby the printing ribbon is permitted to be transported a predetermined distance in said predetermined direction with the strip of material relative to said platen while being pressed by the type and, when subsequently released by the type, to return the same distance in said opposite direction relative to said platen; said yieldable means having: a pullback lever pivotally supported on said panel at a point intermediate both ends thereof, a pair of rollers rotatably mounted on both ends of said pullback lever, and, resilient means yieldably urging said pullback lever to a predetermined angular position, said pullback lever being angularly displaceable from said predetermined position against the force the force of said resilient means when the printing ribbon is transported in said predetermined direction relative to said platen;
  (f) takeup reel actuating means coupled to said takeup reel for causing said takeup reel to wind up a length of the printing ribbon corresponding to the width of the character on the typeface after each time the type has been pressed against the printing ribbon; and,
  (g) drawoff means for drawing the successive desired lengths of the printing ribbon from between said platen and said type carrier coupled to said yieldable means and for feeding the printing ribbon toward said takeup reel, said drawoff means including: a pair of drawoff rollers with means urging said drawoff rollers against each other via the printing ribbon under sufficient pressure to hold the ribbon frictionally arrested therebetween when the ribbon is transported in said predetermined direction by the type, and drawoff roller actuating means including a drawoff roller shaft on one of said drawoff rollers for intermittently rotating said drawoff rollers through a predetermined angle in step with the rotation of said takeup reel, said drawoff roller actuating means also including: a cam coupled to and constantly rotated by said drive means, a cam follower mounted on said cam for translating the rotary motion of said cam into reciprocal motion, said cam follower having a free end with link means at said free end, a one-way clutch coupled to said link means, said one-way clutch being operatively connected to said drawing roller shaft transmitting the reciprocal motion of said cam follower to said one drawoff roller via said one-way clutch whereby said one drawoff roller is rotated only in such a direction that the printing ribbon is fed toward said takeup reel.

* * * * *